(12) United States Patent
Wang

(10) Patent No.: US 9,454,013 B2
(45) Date of Patent: Sep. 27, 2016

(54) AUTOSTEREOSCOPIC DISPLAY DEVICE AND PROJECTING METHOD USING THE SAME

(71) Applicant: DELTA ELECTRONICS, INC., Taoyuan Hsien (TW)

(72) Inventor: Yu-Chang Wang, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 344 days.

(21) Appl. No.: 14/024,807

(22) Filed: Sep. 12, 2013

(65) Prior Publication Data

US 2015/0015855 A1    Jan. 15, 2015

(30) Foreign Application Priority Data

Jul. 15, 2013  (TW) .............................. 102125267 A

(51) Int. Cl.
| | | |
|---|---|---|
| *G02B 27/22* | (2006.01) | |
| *G02B 26/08* | (2006.01) | |
| *H04N 13/04* | (2006.01) | |

(52) U.S. Cl.
CPC ....... *G02B 27/2235* (2013.01); *G02B 26/0816* (2013.01); *G02B 27/225* (2013.01); *H04N 13/042* (2013.01); *H04N 13/0418* (2013.01); *H04N 13/0459* (2013.01)

(58) Field of Classification Search
CPC .... G02B 27/22; G02B 27/225; G02B 27/24; G03B 21/2066; G03B 21/2033; G03B 21/14
USPC .............. 353/7, 10; 359/212.2, 216.1, 219.2, 359/217.2, 462, 471, 478, 479; 348/54
See application file for complete search history.

(56) References Cited

U.S. PATENT DOCUMENTS

| | | | |
|---|---|---|---|
| 3,818,129 A | 6/1974 | Yamamoto | |
| 6,443,930 B1* | 9/2002 | Silverstein | ............ A61F 13/471 604/349 |
| 7,023,466 B2* | 4/2006 | Favalora | ................ G02B 27/22 348/42 |
| 2010/0128225 A1* | 5/2010 | Nishino | ............. G02B 26/0841 353/31 |
| 2011/0285968 A1* | 11/2011 | Huang | ................... G03B 35/24 353/31 |
| 2015/0131058 A1* | 5/2015 | Huang | ............... G02B 27/2214 353/7 |

FOREIGN PATENT DOCUMENTS

| | | |
|---|---|---|
| CN | 1415994 | 5/2003 |
| TW | 329503 | 4/1998 |
| TW | 200832045 | 8/2008 |
| TW | 200844625 | 11/2008 |
| TW | 201033723 | 9/2010 |

* cited by examiner

*Primary Examiner* — William C Dowling
(74) *Attorney, Agent, or Firm* — Hauptman Ham, LLP

(57) ABSTRACT

An autostereoscopic display device includes a first light source, a light beam deviating device, a first light modulator, a lens, and an optical module. The first light source is configured for providing a first light beam. The light beam deviating device is configured for deviating the first light beam propagated from the first light source to different directions in sequence. The first light modulator is configured for modulating the first light beam into a plurality of first image light beams in sequence. The optical module is configured for guiding the first light beam propagated from the light beam deviating device to the first light modulator, and guiding the first image light beams to the lens.

11 Claims, 9 Drawing Sheets

AUTOSTEREOSCOPIC DISPLAY DEVICE AND PROJECTING METHOD USING THE SAME

RELATED APPLICATIONS

This application claims priority to Taiwan Application Serial Number 102125267, filed Jul. 15, 2013, which is herein incorporated by reference.

BACKGROUND

1. Technical Field

The present disclosure relates to an autostereoscopic display device.

2. Description of Related Art

Exploiting the binocular parallax of humans, a stereoscopic display provides two different images respectively to the two eyes of an observer, such that the observer can experience a stereoscopic image. An autostereoscopic display, unlike other kinds of stereoscopic displays which require special glasses to distinguish left-eye and right-eye images, provides a plurality of images by using a plurality of light sources, in which the images are projected to different spatial positions. The eyes of an observer can receive different images so as for the observer to perceive a stereoscopic image when his or her eyes correspond to any two of the spatial positions respectively.

Since the autostereoscopic display is able to avoid the inconvenience caused from the stereoscopic display, it has become an important and developing technology in recent times. The conventional autostereoscopic displays typically adopt projectors as light source. However, a plurality of such projectors are used to provide an image in a conventional autostereoscopic display, which results in a large size and high cost for the display. Moreover, concerning the slit switch light field technology, images in non-working views must be blocked, which results in the efficiency of the display being inversely proportional to the number of the views. In this regard, a great deal of brightness is lost accordingly and thus a large size of the autostereoscopic display is hard to be achieved.

SUMMARY

An aspect of the present invention provides an autostereoscopic display device. The autostereoscopic display device includes a first light source, a light beam deviating device, a first light modulator, a lens, and an optical module. The first light source is configured for providing a first light beam. The light beam deviating device is configured for deviating the first light beam propagated from the first light source to different directions in sequence. The first light modulator is configured for modulating the first light beam into a plurality of first image light beams in sequence. The optical module is configured for guiding the first light beam propagated from the light beam deviating device to the first light modulator, and guiding the first image light beams to the lens.

In one or more embodiments, the light deviating device includes a rotational mirror wheel and an actuator. The rotational mirror wheel includes a rotational wheel and a plurality of reflection mirrors. The rotational wheel has a rotational axis. The reflective mirrors are disposed at the side of the rotational wheel. At least one reflective area is formed on each of the reflective mirrors when the first light beam impinges on the reflective mirror, and the first light beam is reflected from the reflective area. An angle is formed between the rotational axis and a normal line of the reflective area of each of the reflective mirrors. The angles of the reflective areas of the plurality of the reflective mirrors are different. The actuator is connected to the rotational mirror wheel, and the actuator is configured for rotating the rotational mirror wheel.

In one or more embodiments, the angles of the reflective areas formed on the same reflective mirror in sequence are the same when the rotational mirror wheel rotates.

In one or more embodiments, the optical module includes at least one converging lens and a prism group. The converging lens is configured for converging the first light beam reflected from the light beam deviating device to the first light modulator. The prism group is configured for guiding the first light beam passing through the converging lens to the first light modulator, and guiding the first image light beams to the lens.

In one or more embodiments, the optical module further includes a reflective mirror configured for reflecting the first light beam passing through the converging lens to the prism group.

In one or more embodiments, the autostereoscopic display device further includes a second light source, a third light source, and a light combining module. The second light source is configured for providing a second light beam. The third light source is configured for providing a third light beam. The light combining module is configured for guiding the first light beam, the second light beam, and the third light beam to the light beam deviating device, respectively. The light beam deviating device is further configured for respectively deviating the second light beam and the third light beam to different directions in sequence, and deviating angles of the second light beam and the third light beam are substantially the same as a deviating angle of the first light beam in the same time period.

In one or more embodiments, the first light modulator is further configured for modulating the second light beam into a plurality of second image light beams in sequence, and modulating the third light beam into a plurality of third image light beams in sequence. The optical module is further configured for guiding the second light beam and the third light beam propagated from the light beam deviating device to the first light modulator, and guiding the second image light beams and the third image light beams to the lens.

In one or more embodiments, the autostereoscopic display device further includes a second light modulator and a third light modulator. The second light modulator is configured for modulating the second light beam into a plurality of second image light beams. The third light modulator is configured for modulating the third light beam into a plurality of third image light beams. The optical module is further for guiding the second light beam propagated from the light beam deviating device to the second light modulator, guiding the third light beam propagated from the light beam deviating device to the third light modulator, and guiding the second image light beams and the third image light beams to the lens.

In one or more embodiments, the autostereoscopic display device further includes a beam forming element and a reflective mirror. The beam forming element is disposed between the first light source and the light beam deviating device. The reflective mirror is configured for reflecting the first light beam propagated from the first light source to the light beam deviating device.

In one or more embodiments, the light beam deviating device is an acousto-optic modulator, an electro-optical modulator, or a galvanometer mirror.

An another aspect of the present invention provides a projection method of a projecting device. The projecting method includes the following steps:

A rotational mirror wheel is rotated. The rotational mirror wheel includes a plurality of reflective mirrors. A first light beam is guided to at least one of the reflective mirrors of the rotational mirror wheel to deviate the first light beam to to different directions in sequence. The first light beam is modulated into a plurality of first image light beams in sequence. The first image light beams are guided to a lens.

In one or more embodiments, the step of guiding the first light beam to at least one of the reflective mirrors of the rotational mirror wheel includes guiding the first light beam to adjacent two of the reflective mirrors of the rotational mirror wheel to split the first light beam into two portions. A portion of the first light beam is deviated to a first direction, and another portion of the first light beam is deviated to a second direction. The step of modulating the first light beam includes guiding the two portions of the first light beam to a light modulator simultaneously to form two projection segments on a modulating surface of the light modulator, where positions of the two projection segments on the modulating surface are complementary, and modulating the first light beam projected to the two projection segments into different first image light beams simultaneously.

In one or more embodiments, an area of one of the two projection segments increases to cover the modulating surface of the light modulator as rotating the rotational mirror wheel.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
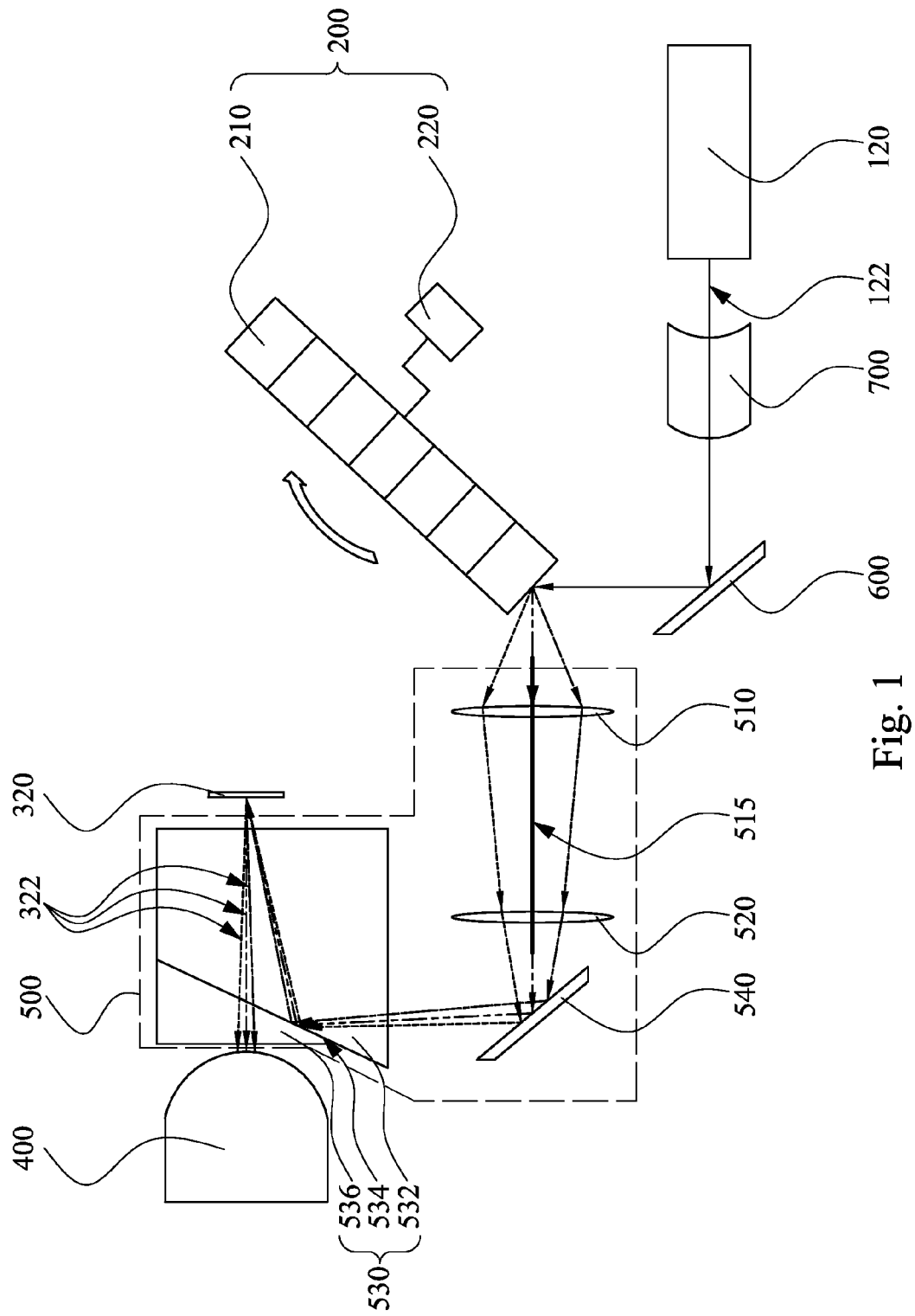
FIG. 1 is a schematic diagram of an autostereoscopic display device according to one embodiment of the present invention.

FIG. 1 is a schematic diagram of an autostereoscopic display device according to one embodiment of the present invention. The autostereoscopic display device includes a first light source 120, a light beam deviating device 200, a first light modulator 320, a lens 400, and an optical module 500. The first light source 120 is configured for providing a first light beam 122. The light beam deviating device 200 is configured for deviating the first light beam 122 propagated from the first light source 120 to different directions in sequence. The first light modulator 320 is configured for modulating the first light beam 122 into a plurality of first image light beams 322 in sequence. The optical module 500 is configured for guiding the first light beam 122 propagated from the light beam deviating device 200 to the first light modulator 320, and guiding the first image light beams 322 to the lens 400. In this embodiment, the first light source 120 can be a laser. However, the scope of the claimed invention should not be limited in this respect.

The first light beam 122 emitted from the first light source 120 propagates to the light beam deviating device 200, and is then deviated to different directions in sequence by the light beam deviating device 200 and is incident to the optical module 500. Subsequently, the optical module 500 guides and converges the first light beams 122 with different directions in sequence to the first light modulator 320. The first light modulator 320 then modulates the first light beams 122 reaching in different time periods into different first image light beams 322 with different images. The first image light beams 322 with different images are incident to the optical module 500 at to different deviating angles, and they are guided to the lens 400 by the optical module 500. Therefore, the autostereoscopic display device in the present embodiment can project the different first image light beams 322 to different views through the lens 400 in sequence, and a user can experience a stereoscopic image if his or her eyes are in different views.

It should be understood that the solid arrows in FIG. 1 represent the propagation path of the first light beam 122 before being deviated, and the dashed arrows in FIG. 1 represent the propagation paths of the first light beam 122 after being deviated, and the propagation paths of the first image light beams 322, where the propagation paths in different time periods are represented by different types of dashed arrows. Moreover, although there are three types of the dashed arrows in FIG. 1, the scope of the claimed invention should not be limited in this respect. In real situations, the number of the propagation paths of the first light beam 122 after being deviated depends on the light beam deviating device 200.

Since the light beam deviating device 200 can deviates the first light beam 122 emitted from the first light source 120 to different directions in sequence, the autostereoscopic display device in this embodiment can generate the first image light beams 322 corresponding to different views using a single light source, resulting in a smaller size and a lower cost of the autostereoscopic display device.

Figure 2:
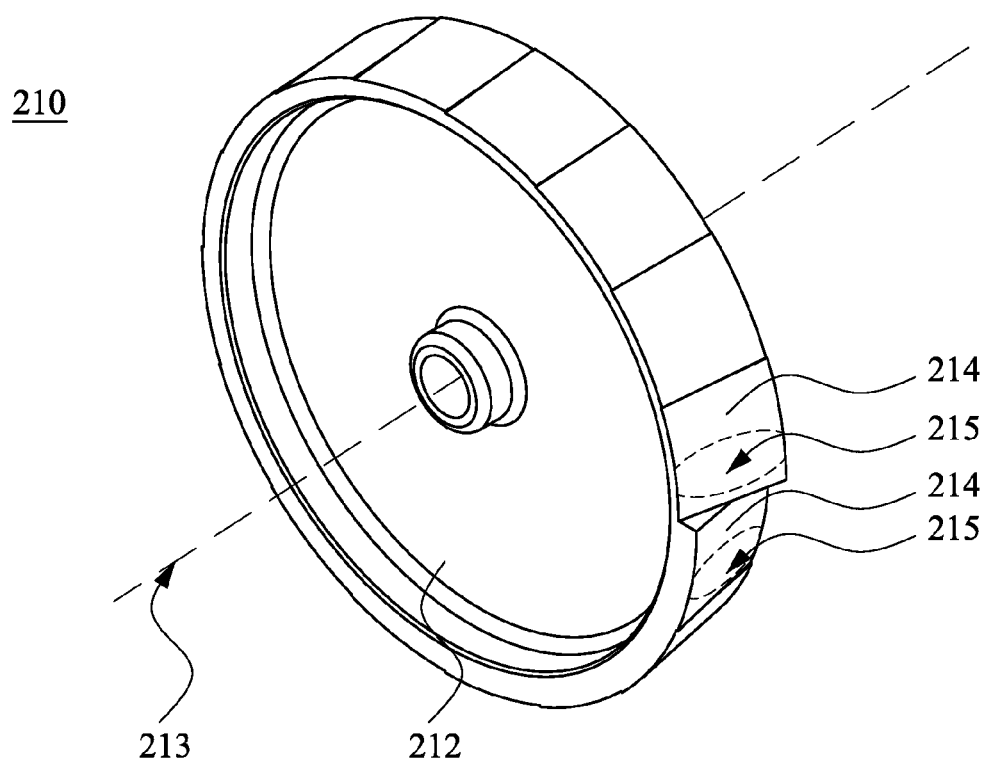
FIG. 2 is a three dimensional view of a rotational mirror wheel of FIG. 1 in two time periods.

In this embodiment, the light beam deviating device 200 can include a rotating mirror wheel 210 and an actuator 220. The actuator 220 is connected to the rotational mirror wheel 210, and the actuator 220 is configured for rotating the rotational mirror wheel 210. FIG. 2 is a three dimensional view of the rotational mirror wheel 210 of FIG. 1 in two time periods. The rotational mirror wheel 210 includes a rotational wheel 212 and a plurality of reflective mirrors 214. The rotational wheel 212 has a rotational axis 213. The reflective mirrors 214 are disposed at the side of the rotational wheel 212. At least one is reflective area 215 is formed on each of the reflective mirrors 214 when the first light beam 122 (see FIG. 1) impinges on the reflective mirror 214, and the first light beam 122 is reflected from the reflective area 215.

Figure 3A:
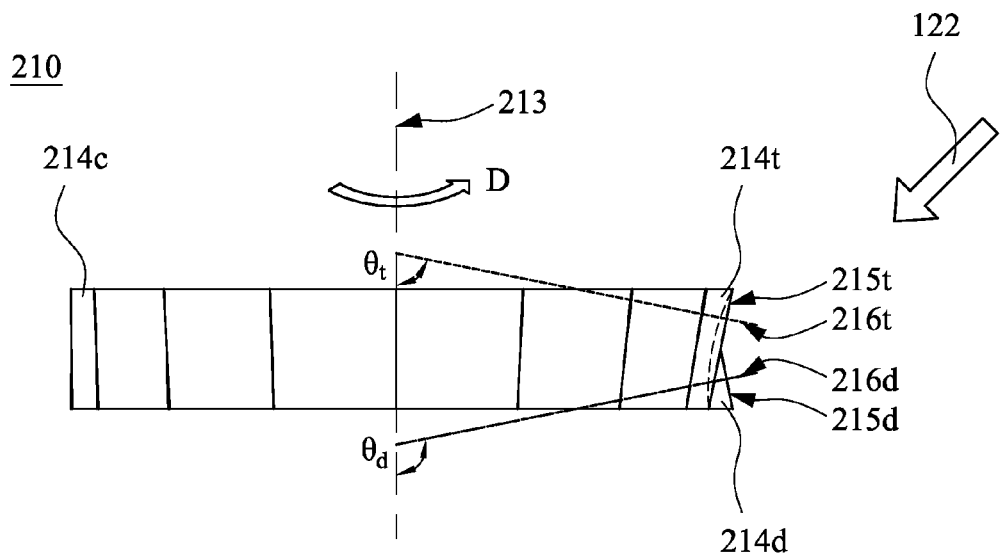
FIG. 3A is a side view of the rotational mirror wheel of FIG. 1 in two time periods.

FIG. 3A is a side view of the rotational mirror wheel 210 of FIG. 1 in two time periods. An angle is formed between the rotational axis 213 and a normal line of the reflective area of each of the reflective mirrors, and the angles between the rotational axis 213 and the normal lines of the reflective areas of the plurality of the reflective mirrors are different. Taking FIG. 3A as an example, in one of the time periods, the angle $\theta_t$ is formed between the rotational axis 213 and the normal line 216$t$ of the reflective area 215$t$ of the reflective mirror 214$t$. In another time period, the angle $\theta_d$ is formed between the rotational axis 213 and the normal line 216$d$ of the reflective area 215$d$ of the reflective mirror 214$d$, where the angle $\theta_t$ is different from the angle $\theta_d$. Since the first light beam 122 is incident the rotational mirror wheel 210 at a specific incident angle, the angle formed between the incident direction of the first light beam 122 and the rotational axis 213 is fixed. However, the angles formed between the rotational axis 213 and normal lines of the reflective areas of different reflective mirrors are different, resulting in different reflective angles of the first light beam 122 reflected from different reflective mirrors. Therefore, the first light beam 122 can be deviated to different directions in sequence as the rotational mirror wheel 210 rotates. For example, in FIG. 3A, the rotational wheel 210 can rotate along a rotational direction D, such that the first light beam 122 can impinge on the reflective mirror 214$t$, . . . , 214$c$, . . . , and 214$d$ in sequence. However, the scope of the claimed invention should not be limited in this respect.

Reference is made back to FIG. 1. The autostereoscopic display device in this embodiment has an advantage of fast view switch since it generates a set of the first image light beams 322 corresponding to different views as the rotational mirror wheel 210 rotates one circle. For example, each of the views can provide a 60 Hz first image light beam 322 if the rotational mirror wheel 210 rotates 60 circles per second, i.e., 3600 rpm, which is an allowable working speed for the actuator 220.

Figure 3B:
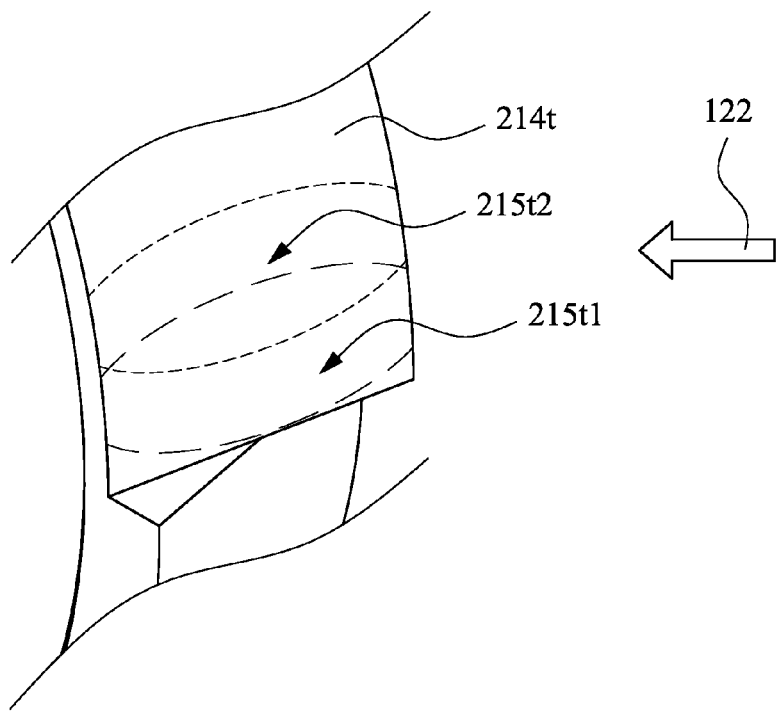
FIG. 3B is a magnified diagram of the rotational mirror wheel of FIG. 2 when it is rotating.

FIG. 3B is a magnified diagram of the rotational mirror wheel 210 of FIG. 2 when it is rotating. Reference is made to FIG. 3A and FIG. 3B. In one or more embodiments, a plurality of the reflective areas formed on the same reflective mirror have the same angle when the rotational mirror wheel 210 is rotating. Taking FIG. 3B as an example, the first light beam 122 forms the reflective areas 215$t$1 and 215$t$2 on the reflective mirror 214$t$ in sequence when the rotational mirror wheel 210 is rotating. In addition, the angles of the reflective areas 215$t$1 and 215$t$2 are both $\theta_t$ (see FIG. 3A). In other words, for each reflective mirror, the directions of the normal lines of the reflective areas is constant as the rotational mirror wheel 210 is rotating, resulting in the same reflective angle of the first light beam 122 on the same reflective mirror, which gives an advantage of gray scale modulation of the first image light beams 322 (see FIG. 1).

In greater detail, reference is made to FIG. 1. The first light modulator 320 can be a digital micromirror device (DMD) including a plurality of microscopic mirrors, each of which can modulate a pixel image of the first image light beam 322. A Pulse Width Modulation (PWM) technique can be used to provide switch signals, such as 8-bit signals, to each microscopic mirror is for modulating the gray scale of the corresponded pixel image. The microscopic mirror can be turned on or off eight times according to the switch signal. The microscopic mirror reflects the first light beam 122 to the lens 400 eight times when it is turned on eight times, such that the pixel image has the largest brightness. In contrast, the microscopic mirror reflects the first light beam 122 to other position eight times when it is turned off eight times, such that the pixel image shows black image. In this way, the digital micromirror device can modulate gray scale of the first image light beam 322 as long as modulating the ratio of turn-on to turn-off signals of each microscopic mirror. In addition, since the reflective angle of the first light beam 122 on the same reflective mirror is constant, the first light beam 122 reflected by one microscopic mirror can be reflected to the same spatial point to do brightness superposition during eight-times modulation, leading in the gray scale modulation of the first image light beams 322. In one or more embodiments, the time period of the first light beam 122 impinging on the same reflective mirror can be longer than the time period of PWM modulation, i.e., the arc length of each reflective mirror divided by the angular velocity is longer than the time period of the PWM modulation. It should be noticed that the type (i.e., DMD) of the first light modulator 320 mentioned above is illustrative only and should not limit the scope of the claimed invention. A person having ordinary skill in the art may select a proper type for the first light modulator 320 according to actual requirements.

Reference is made back to FIG. 1 and FIG. 2. Since the angles formed between the rotational axis 213 and all of the reflective areas 215 of the same reflective mirror 214 are the same, while the angles formed between the is rotational axis 213 and reflective areas 215 of different reflective mirrors 214 are different, the first light beam 122 can be deviated to the next deviating direction directly as it is reflected from one reflective mirror 214 to another. In other words, the deviated directions of the first light beam 122 are discontinuous, leading no crosstalk between the first image light beams 322 and a better gray scale modulation in the autostereoscopic display device.

Reference is made back to FIG. 1. The following paragraphs provide detailed explanations with respect to how to obtain the first image light beams 322 with different deviating directions. The optical module 500 includes converging lenses 510, 520, and a prism group 530. The converging lenses 510 and 520 are configured for converging the first light beam 122 reflected from the light beam deviating device 200 to the first light modulator 320. The prism group 530 is configured for guiding the first light beam 122 passing through the converging lenses 510 and 520 to the first light modulator 320, and guiding the first image light beams 322 to the lens 400. The prism group 530 includes a first prism 532 and a second prism 536, where the first prism 532 and the second prism 536 define a gap 534 therebetween. The optical module 500 further includes a reflective mirror 540 configured for reflecting the first light beam 122 passing through the converging lenses 510 and 520 to the prism group 530. In addition, the autostereoscopic display device can further to includes a reflective mirror 600 configured for reflected the first light beam 122 propagated from the first light source 120 to the light beam deviating device 200. However, the scope of the claimed invention should not be limited in this respect. An embodiment falls within the scope of the claimed invention if the first light beam 122 propagated from the first light source 120 impinges to the light beam deviating device 200 directly.

In a first time period, one of the reflective mirrors 214 (see FIG. 2) of the rotational mirror wheel 210 is disposed on the propagation path of the first light beam 122 by the actuator 220. The first light beam 122 emitted from the first light source 120 is reflected to the reflective mirror 214 of the rotational mirror wheel 210 by reflection of the reflective mirror 600. Being deviated with an angle by the reflective mirror 214, the first light beam 122 is then reflected to the converging lens 510. As passing through the converging lenses 510 and 520 in sequence, the first light beam 122 is deviated toward the optical axis 515 of the converging lenses 510 and 520 and then impinges on the reflective mirror 540. The reflective mirror 540 reflects the first light beam 122 to the first prism 532 of the prism group 530. Subsequently, the first light beam 122 is reflected to the first light modulator 320 by the gap 534 of the prism group 530, and is modulated to be the first image light beams 322. Being back to the first prism 532, the first image light beams 322 then pass through the gap 534 and the second prism 536 to the lens 400. Consequently, the first image light beams 322 corresponding to different views can be obtained as long as rotating the rotational mirror wheel 210 in sequence to dispose the reflective mirrors 214 of the rotational mirror wheel 210 on the propagation path of the first light beam 122 in turn.

It should be noticed that although the optical module 500 includes converging lenses 510 and 520 in this embodiment, the number of the converging lens should not be limited. In other embodiments, a person having ordinary skill in the art may select the number of the converging lens(es). Moreover, the reflective mirror 540 can be omitted. An embodiment falls within the scope of the claimed invention if the first light beam 122 passing through the converging lenses 510 and 520 can reach the prism group 530.

Figure 4:
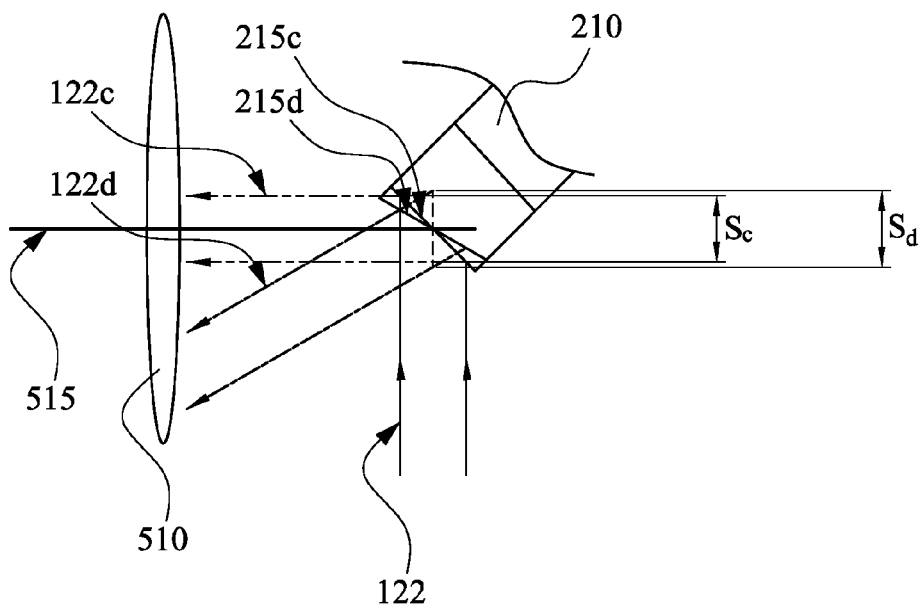
FIG. 4 is an optical path diagram of a first light beam from a reflective is mirror to a converging lens of FIG. 1.

FIG. 4 is an optical path diagram of the first light beam 122 from the reflective mirror 600 to the converging lens 510 of FIG. 1. To simplify matter, FIG. 4 only shows the optical paths of the first light beam 122 in two time periods. In this embodiment, the first light beam 122 forms a virtual light source surface on the reflective area of each reflective mirror, where the virtual light source surfaces are all perpendicular to the optical axis 515 of the converging lens 510. Taking FIG. 4 as an example, the first light beam 122 forms a virtual light source surface $S_c$ on the reflective area 215$c$, and forms a virtual light source surface $S_d$ on the reflective area 215$d$, where the virtual light source surfaces $S_c$ and $S_d$ both are perpendicular to the optical axis 515. In greater detail, reference is made to FIG. 1 and FIG. 4. An image surface on the first light modulator 320 formed by the first light beam 122 after passing through the converging lenses 510 and 520 is equivalent to an image surface on the first light modulator 320 formed by the light emitted from the virtual light source surface after passing through the converging lenses 510 and 520, which means the light emitted from the virtual light source surface is equivalent to the first light beam 122 impinging on the reflective mirror of the rotational mirror wheel 210. As shown in FIG. 4, the virtual light source surfaces of the reflective areas of different reflective mirrors have different sizes. For example, the size of the virtual light source surface $S_c$ is smaller than that of the visual light source surface $S_d$. The light emitted from the virtual light source surfaces forms the image surfaces with different sizes on the first light modulator 320. In other words, the light sources of the image surfaces, i.e., the virtual light source surfaces, lack of spatial coherence, leading to a diffusion effect between the image surfaces formed on the first light modulator 320. For example, the diffusion effect can suppress the laser speckle if the first light source 120 is a laser.

Figure 5A:
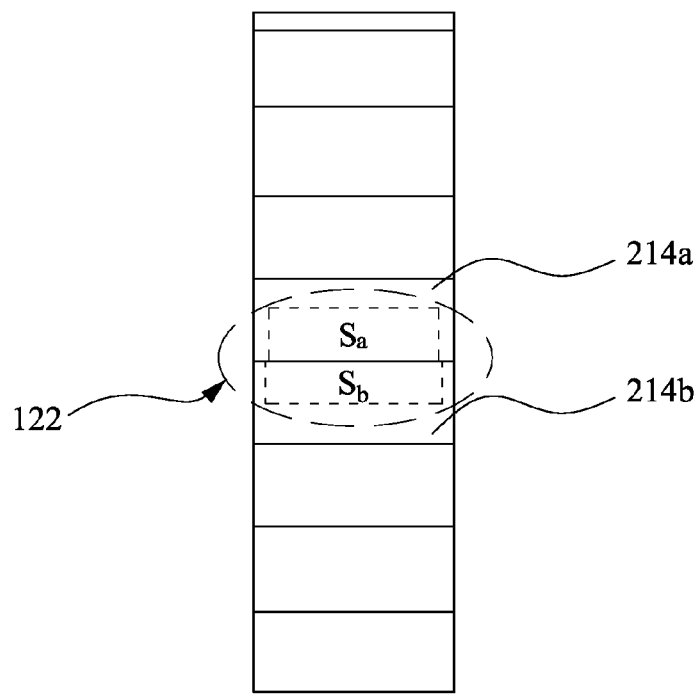
FIG. 5A is a front view of the rotational mirror wheel of FIG. 1.

While the aforementioned paragraphs describe the situations about the first light beam 122 impinging on the single reflective mirror of the rotational mirror wheel 210, the following paragraphs provide detailed explanations with respect to the first light beam 122 impinging on two adjacent reflective mirrors of the rotational mirror wheel 210 simultaneously. FIG. 5A is a front view of the rotational mirror wheel 210 of FIG. 1. Reference is made to FIG. 1 and FIG. 5A. In greater detail, the first light beam 122 can be split into two portions when it impinges on the reflective mirrors 214$a$ and 214$b$ simultaneously. The portion of the first light beam 122 impinging on the reflective mirror 214$a$ is deviated to a first direction, while another portion of the first light beam 122 impinges on the reflective mirror 214$b$ is deviated to a second direction which is different from the first direction. However, these two portions of the first light beam 122 both pass through the converging lenses 510 and 520 to the first light modulator 320. It should be noticed that the spot size of the first light beam 122 relative to the size of each reflective mirror in FIG. 5A is illustrative only and should not limit the scope of the claimed invention.

Figure 5B:
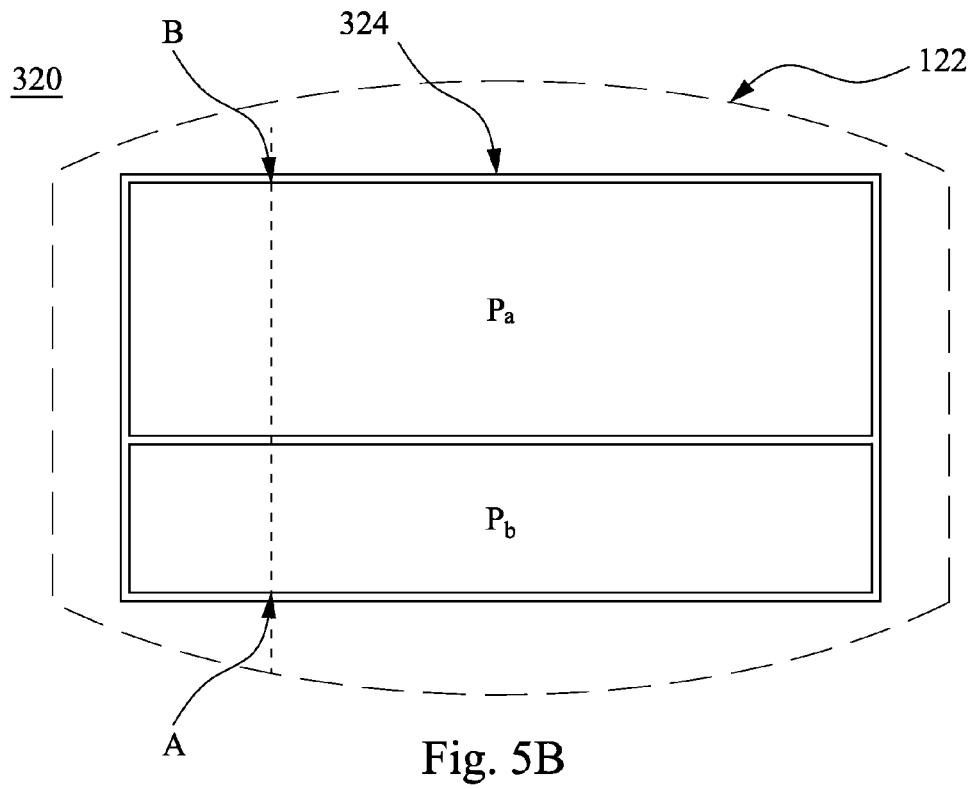
FIG. 5B is a schematic diagram of projection segments $P_a$ and $P_b$ on a first light modulator corresponded to visual surfaces $S_a$ and $S_b$ of FIG. 5A.

FIG. 5B is a schematic diagram of projection segments $P_a$ and $P_b$ on the first light modulator 320 corresponded to the virtual surfaces $S_a$ and $S_b$ of FIG. 5A. Reference is made to FIG. 5A and FIG. 5B. The projection segment $P_a$ is formed on a modulating surface 324 of the first light modulator 320 by the portion of the first light beam 122 impinging on the reflective mirror 214$a$, while the projection segment $P_b$ is formed on a modulating surface 324 of the first light modulator 320 by the portion of the first light beam 122 impinging on the reflective mirror 214$b$, where the first light beam 122 impinging on the projection segment $P_a$ is propagated from the virtual light source surface $S_a$ of FIG. 5A, and the first light beam 122 impinging on the projection segment $P_b$ is propagated from the virtual light source surface $S_b$ of FIG. 5A. Since the first light beam 122 covers all of the modulating surface 324 of the first light modulator 320, the positions of the two projection segments $P_a$ and $P_b$ on the modulating surface are complementary. The first light modulator 320 can respectively modulate the portions of the first light beam 122 impinging on the projection segments $P_a$ and $P_b$ into different first image light beams simultaneously. The first image light beam 322 formed in the projection segment $P_a$ can be guided to a first view by the optical module 500 and the lens 400 (both see FIG. 1), while the first image light beam 322 formed in the projection segment $P_b$ can be guided to a second view by the optical module 500 and the lens 400, such that the autostereoscopic display device in this embodiment can provide the first image light beams 322 corresponding to two views. In other words, the first light modulator 320 can respectively provide different modulating signals to the projection segments $P_a$ and $P_b$ when the first light beam 122 impinges on adjacent two reflective mirrors 214$a$ and 214$b$, such that the first image light beams 322 with different images can be guided to different views, resulting in no crosstalk and no black frame requirement between these two first image light beams.

Figure 5C:
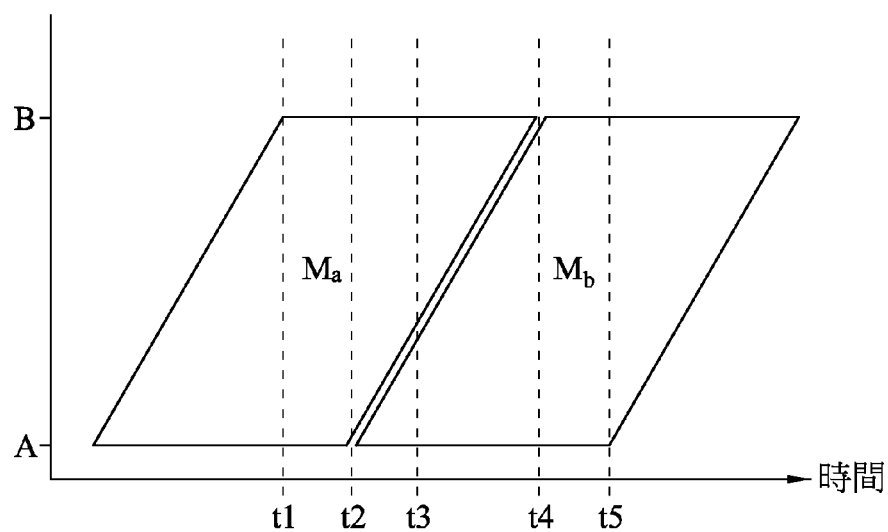
FIG. 5C is a diagram of time vs. modulating signals $M_a$ and $M_b$ from points A to B of FIG. 5B.

FIG. 5C is a diagram of time vs. modulating signals $M_a$ and $M_b$ from points A to B of FIG. 5B. Reference is made to FIG. 5B and FIG. 5C. Taking the digital micromirror device as an example, the points A to B can represent a is column of the microscopic mirrors of the digital micromirror device. The projection segments $P_a$ and $P_b$ in this embodiment are both rectangular, and the shapes of the projection segments $P_a$ and $P_b$ are different in sequence at the extension direction of points A to B, leading in the same modulating method for each column of the microscopic mirrors. Therefore, the following paragraphs provide detailed explanations with respect to the modulating signals $M_a$ and $M_b$ from points A to B, i.e., a single column. The microscopic mirrors in the projection segment $P_a$ have the modulating signal $M_a$ to modulate the first light beam 122 into the first image light beam corresponding to the first view, and the microscopic mirrors in the projection segment $P_b$ have the modulating signal $M_b$ to modulate the first light beam 122 into the first image light beam corresponding to the second view. Moreover, a time period between time t1 to t2 is defined as a first time period where the first light beam 122 only impinges on the reflective mirror 214a of FIG. 5A. A time period between time t4 to t5 is defined as a second time period where the first light beam 122 only impinges on the reflective mirror 214b of FIG. 5A. The first light beam 122 impinges on the reflective mirrors 214a and 214b simultaneously during time t2 to t4, and time t3 points out the state of FIG. 5B.

Reference is made to FIG. 5A to FIG. 5C. During the first time period, i.e., the period between time t1 and t2, the first light beam 122 impinges on the reflective mirror 214a, such that the projection segment $P_a$ covers the modulating surface 324 of the first light modulator 320. The points A to B of the first light modulator 320 are all provided the modulating signal $M_a$ to modulate all of the first light beam 122 into the first image light beam corresponding to the first view. As the rotational mirror wheel 210 rotates, the first light beam 122 starts to impinge on the reflective mirror 214b when the first time period is over, i.e., at time t2, and the projection segment $P_b$ starts to be shown on the modulating surface 324. The area of the projection segment $P_b$ increases as the rotational mirror wheel 210 rotates during time t2 to t4, and the projection segment $P_b$ completely covers the modulating surface 324 at the time t4. Moreover, since the positions of the two projection segments $P_a$ and $P_b$ on the modulating surface 324 are complementary, the area of the projection segment $P_a$ decreases as the rotational mirror wheel 210 rotates during time t2 to t4. Therefore, the signal at point A is switched to the modulating signal $M_b$, while that at point B is still the modulating signal $M_a$. The modulating signal $M_b$ makes the first light beam 122 impinge on the projection segment $P_b$ as the first image light beam corresponding to the second view, and the modulating signal $M_a$ makes the first light beam 122 impinge on the projection segment $P_a$ as the first image light beam corresponding to the first view simultaneously. As the rotational mirror wheel 210 keeps rotate, the signals of the microscopic mirrors from point A to B are switched to modulating signal $M_b$ in sequence, such that the first image light beam corresponding to the second view is increased, while the first image light beam corresponding to the first view is decreased. The signals of point A to B are switched to the modulating signal $M_b$ at time t4, which means the first light modulator 320 modulates all of the first light beam 120 into the first image light beam corresponding to the second view. Consequently, the autostereoscopic display device starts the second time period. As such, the autostereoscopic display device can provide multi-view first image light beams simultaneously without adding black frame as long as the first light beam 122 are modulated in sequence as mentioned above.

Reference is made back to FIG. 1. In one or more embodiments, the autostereoscopic display device can include a beam forming element 700 disposed between the first light source 120 and the light beam deviating device 200. The beam forming element 700 makes the first light beam 122 passing therethrough to be a directivity light beam with suitable spot size by converging or changing the spot size of the first light beam 122, and leading to a high quality first light beam 122.

Figure 6:
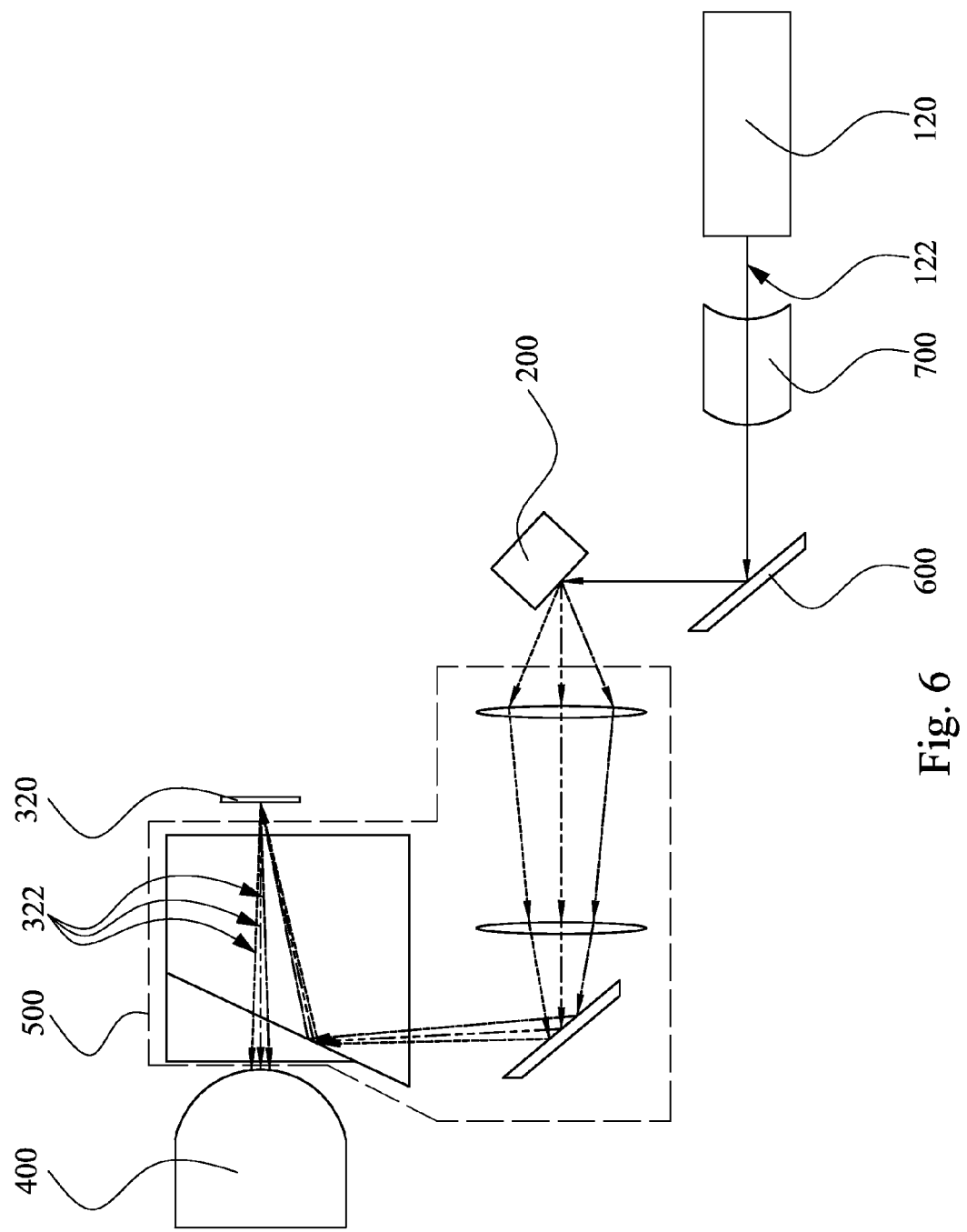
FIG. 6 is a schematic diagram of the autostereoscopic display device according to another embodiment of the present invention.

FIG. 6 is a schematic diagram of the autostereoscopic display device according to another embodiment of the present invention. The difference between the present embodiment and the embodiment of FIG. 1 pertains to the type of the light beam deviating device 200. In this embodiment, the light beam deviating device 200 can be an acousto-optic modulator (AOM), an electro-optic modulator (EOM), or a galvanometer mirror. The acousto-optic modulator can modulate the diffraction of a light beam impinging thereon by providing sound wave to a medium of the acousto-optic modulator to adjust the reflective index of the medium periodically. The electro-optic modulator can modulate the electrical field direction of a light beam impinging thereon by providing an electrical field to a medium of the electro-optic modulator to adjust the lattice alignment of the medium. The galvanometer mirror can modulate the reflective direction of the light beam impinging thereon by adjusting the to rotational angle of the galvanometer mirror, where the rotational angle is adjusted by a torque force generated between a magnetic coil and a magnet of the galvanometer mirror, and the magnetic force of the magnetic coil can be adjusted by current applied thereto. As such, all of the acousto-optic modulator, the electro-optic modulator, and the galvanometer mirror can be used to deviate the first light beam 122. Other features of the autostereoscopic display device are the same as those of the autostereoscopic display device shown in FIG. 1, and therefore, a description in this regard will not be provided hereinafter.

Figure 7:
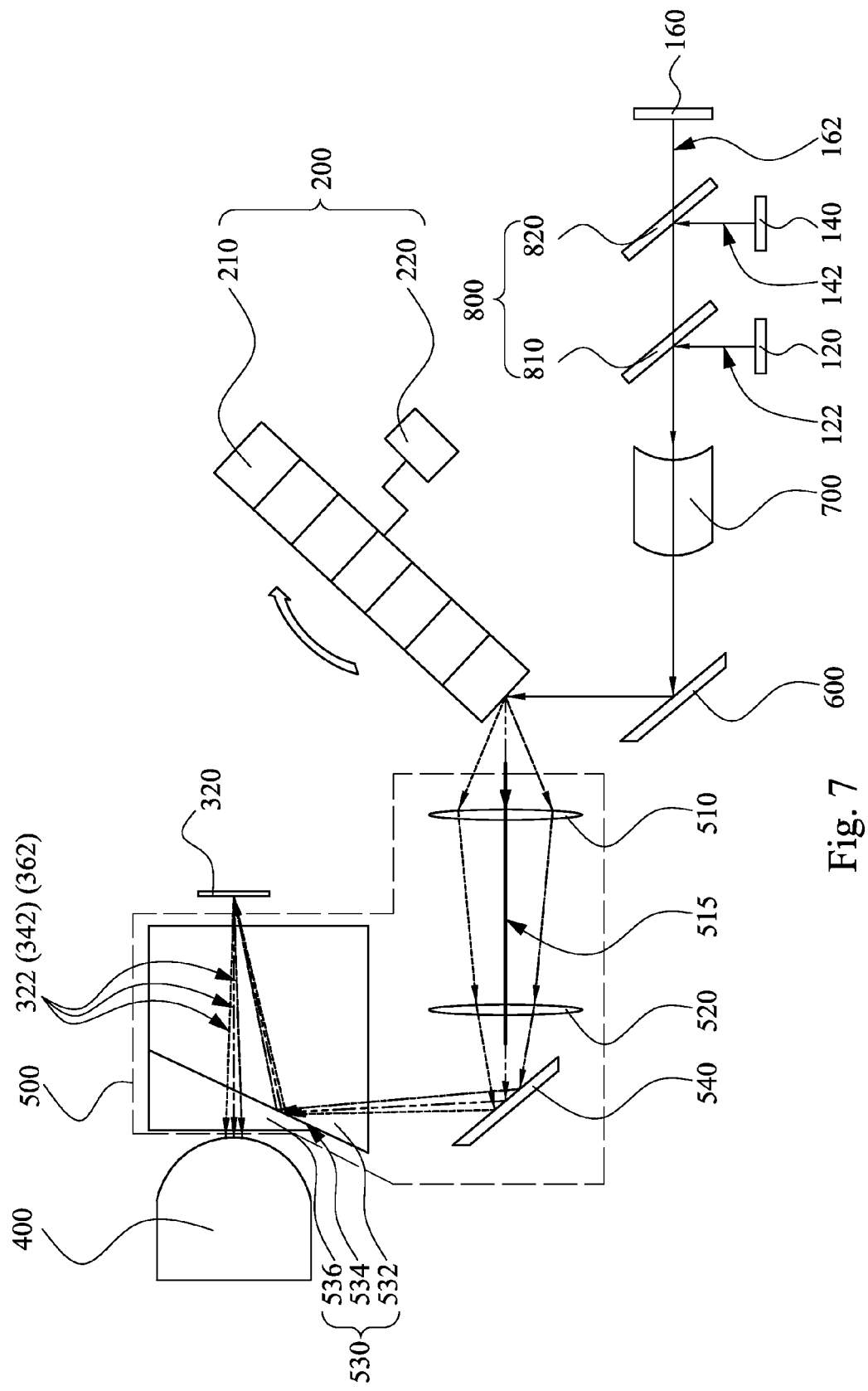
FIG. 7 is a schematic diagram of the autostereoscopic display device according to yet another embodiment of the present invention.

As a single light source display device, the autostereoscopic display device of FIG. 1 or FIG. 6 provides image light beams with single color. However, in other embodiments, the autostereoscopic display device can provide multi-color image light beams. FIG. 7 is a schematic diagram of the autostereoscopic display device according to yet another embodiment of the present invention. The difference between the present embodiment and the embodiment of FIG. 1 pertains to a second light source 140, a third light source 160, and a beam combining module 800. In this embodiment, the first light beam 122 can be a blue light beam, the second light source 140 is configured for providing a second light beam 142 which can be a red light beam, and the third light source 160 is configured for providing a third light beam 162 which can be a green light beam. The beam combining module 800 is configured for guiding the first light beam 122, the second light beam 142, and the third light beam 162 to the light beam deviating device 200, respectively. The light beam deviating device 200 is configured for deviating the first light beam 122, the second light beam 142, and the third light beam 162 propagated from the beam combining module 800 to different directions in sequence. The deviating angles of the second light beam 142 and the third light beam 162 are substantially the same as the deviating angle of the first light beam 122 in the same time period. The first light modulator 320 is further configured for modulating the second light beam 142 into a plurality of second image light beams 342 in sequence, and modulating the third light beam 162 into a plurality of third image light beams 362 in sequence. The optical module 500 is further configured for guiding the second light beam 142 and the third light beam 162 propagated from the light beam deviating device 200 to the first light modulator 320, and guiding the second image light beams 342 and the third image light beams 362 to the lens 400. It should be noticed that the dashed arrows in FIG. 7 represent the propagation paths of the first light beam 122, the second light beam 142, and the third light beam 162 after being deviated, and different types of the dashed arrows respectively represent the propagation paths in different time periods.

It should be understood that "substantially the same" can be used to modify any representation which could permissibly vary without resulting in a change in the basic function to which it is related. For example, the description of "the deviating angles of the second light beam 142 and the third light beam 162 are substantially the same as the deviating angle of the first light beam 122 in the same time period" not only represents the first light beam 122, the second light beam 142, and the third light beam 162 are indeed deviated to the same direction by the light beam deviating device 200 in the same time period, but represents the deviating directions of the first light beam 122, the second light beam 142, and the third light beam 162 may be slightly different as long as the first image light beam 322, the second image light beam 342, and the third image light beam 362 can be projected to the same view. For example, the deviating directions of light beams depend on wavelength, i.e., the deviating directions of the first light beam 122, the second light beam 142, and the third light beam 162 are slightly different, if the light beam deviating device 200 is the acousto-optic modulator, the electro-optical modulator, or the galvanometer mirror. However, the first image light beam 322, the second image light beam 342, and the third image light beam 362 respectively generated from them can be projected to the same view in the same time period. In other words, in this context, the deviating directions are regarded to be substantially the same as long as the first image light beam 322, the second image light beam 342, and the third image light beam 362 can be projected to the same view in the same time period.

Consequently, in a first sub-time period of the first time period, the first light beam 122 emitted from the first light source 120 passes through the beam combining module 800 to the light beam deviating device 200. The first light beam 122 is deviated to a different direction by the light beam deviating device 200 and then is incident to the optical module 500. Subsequently, the optical module 500 guides and converges the first light beam 122 to the first light modulator 320, such that the first light modulator 320 modulates the first light beam 122 into the first image light beam 322. The first image light beam 322 then passes through the optical module 500, and is guided to the lens 400 by the optical module 500.

In a second sub-time period of the first time period, the second light beam 142 emitted from the second light source 140 passes through the beam combining module 800 to the light beam deviating device 200. The second light beam 142 is deviated to the different direction by the light beam deviating device 200 and then is incident to the optical module 500. Subsequently, the optical module 500 guides and converges the second light beam 142 to the first light modulator 320, such that the first light modulator 320 modulates the second light beam 142 into the second image light beam 342. The second image light beam 342 then passes through the optical module 500, and is guided to the lens 400 by the optical module 500.

In a third sub-time period of the first time period, the third light beam 162 emitted from the third light source 160 passes through the beam combining module 800 to the light beam deviating device 200. The third light beam 162 is deviated to the different direction by the light beam deviating device 200 and then is incident to the optical module 500. Subsequently, the optical module 500 guides and converges the third light beam 162 to the first light modulator 320, such that the first light modulator 320 modulates the third light beam 162 into the third image light beam 362. The third image light beam 362 then passes through the optical module 500, and is guided to the lens 400 by the optical module 500.

During the three sub-time periods mentioned above, the first light beam 122, the second light beam 142, and the third light beam 162 are all deviated to the same direction by the light beam deviating device 200, and in the second time period, the actuator 220 changes the reflective mirror 214 (see FIG. 2) disposed on the propagation path of the first light beam 122. As such, the first light beam 122, the second light beam 142, and the third light beam 162 are all deviated to another direction by the light beam deviating device 200 in the second time period. Therefore, according to the method mentioned above, the autostereoscopic display device in this embodiment can project the first image light beams 322, the second image light beams 342, and the third image light beams 362 to different views through the lens 400 in sequence, and the user can experience a colorful stereoscopic image if his or her eyes are in different views.

The following paragraphs provide detailed explanations with respect to the beam combining module 800. The beam combining module 800 includes a first dichroic mirror 810 and a second dichroic mirror 820. The first dichroic mirror 810 allows the second light beam 142 and the third light beam 162 to pass therethrough, and allows the first light beam 122 to be reflected to the light beam deviating device 200. The second dichroic mirror 820 allows the third light beam 162 to pass through, and allows the second light beam 142 to be reflected to the first dichroic mirror 810. Moreover, in this embodiment, the reflective mirror 600 is configured for reflecting the first light beam 122, the second light beam 142, and the third light beam 162 propagated from the beam combining module 800 to the light beam deviating device 200. However, in other embodiments, the first light beam 122, the second light beam 142, and the third light beam 162 propagated from the beam combining module 800 can impinge to the light beam deviating device 200 directly.

Therefore, in the first sub-time period of the first time period, the first light source 120 can be switched on while the second light source 140 and the third light source 160 are switched off. The first light beam 122 emitted from the first light source 120 propagates to the first dichroic mirror 810, and is reflected to the reflective mirror 600 by the first dichroic mirror 810. The reflective mirror 600 then reflects the first light beam 122 to the rotational mirror wheel 210.

In the second sub-time period of the first time period, the second light source 140 can be switched on while the first light source 120 and the third light source 160 are switched off. The second light beam 142 emitted from the second light source 140 propagates to the second dichroic mirror 820 and is reflected to the first dichroic mirror 810. Subsequently, the second light beam 142 passes through the first dichroic mirror 810 and impinges on the reflective mirror 600. The reflective mirror 600 then reflects the second light beam 142 to the rotational mirror wheel 210.

In the third sub-time period of the first time period, the third light source 160 can be switched on while the first light source 120 and the second light source 120 are switched off. The third light beam 162 emitted from the third light source 160 propagates to the second dichroic mirror 820, and passes through the second dichroic mirror 820 and the first dichroic mirror 810 in sequence. Subsequently, the third light beam 162 impinges on the reflective mirror 600 and is reflected to the rotational mirror wheel 210 by the reflective mirror 600. Therefore, the first light beam 122, the second light beam 142, and the third light beam 162 can be generated in sequence. Other features of the autostereoscopic display device are the same as those of the autostereoscopic display device shown in FIG. 1, and therefore, a description in this regard will not be provided hereinafter.

Figure 8:
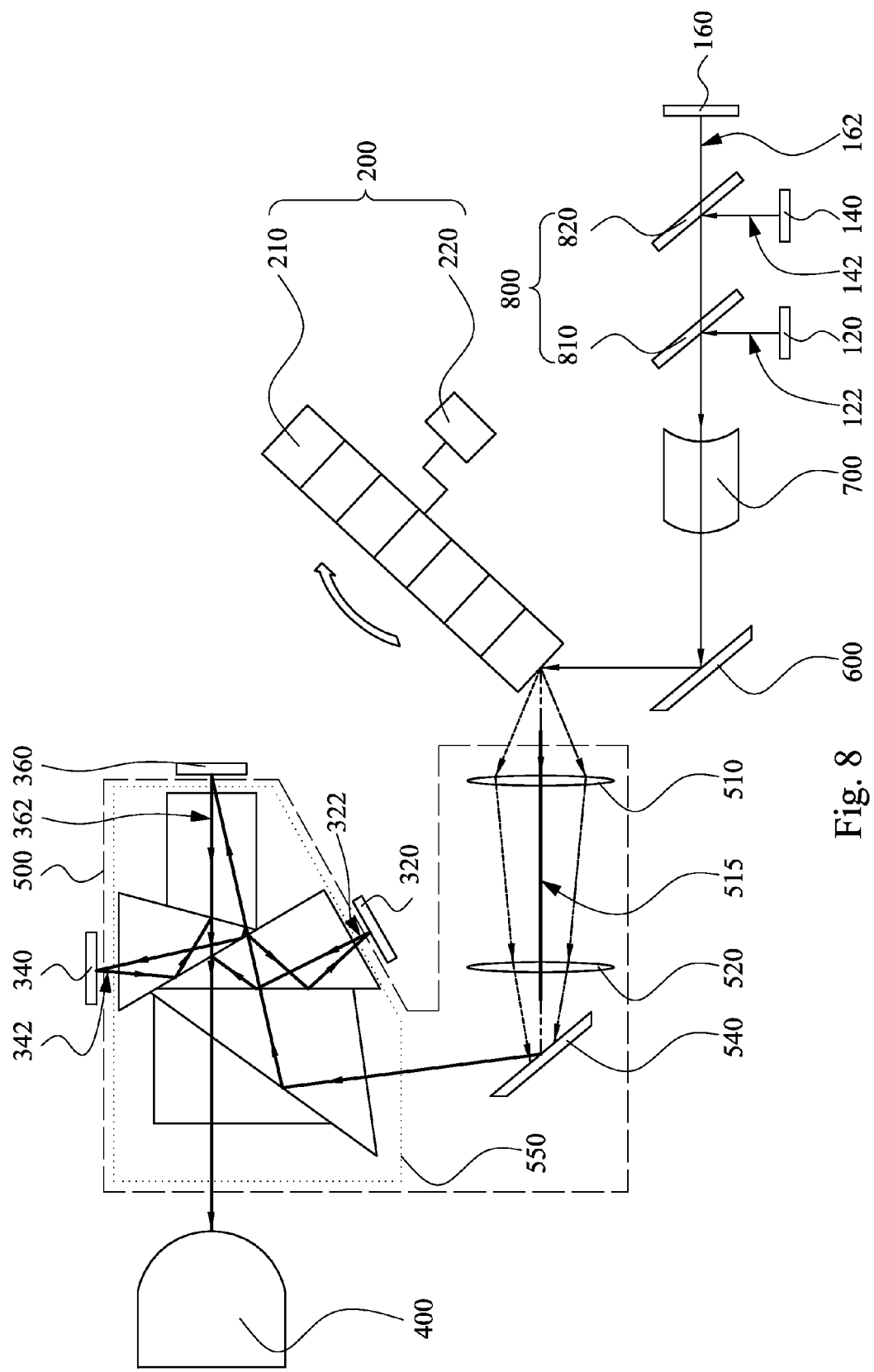
FIG. 8 is a schematic diagram of the autostereoscopic display device according to yet another embodiment of the present invention.

FIG. 8 is a schematic diagram of the autostereoscopic display device according to yet another embodiment of the present invention. The difference between this embodiment and the embodiment of FIG. 7 is the functions of the optical module 500 and the first light modulator 320, the elements of the prism group, a second light modulator 340, and a third light modulator 360. In this embodiment, the first light modulator 320 is configured for modulating the first light beam 122 into a plurality of the first image light beams 322 in sequence, the second light modulator 340 is configured for modulating the second light beam 142 into a plurality of the second image light beams 342 in sequence, and the third light modulator 360 is configured for modulating the third light beam 162 into a plurality of the third image light beams 362 in sequence. The optical module 500 is configured for guiding and converging the first light beam 122 propagated from the light beam deviating device 200 to the first light modulator 320, guiding and converging the second light beam 142 propagated from the light beam deviating device 200 to the second light modulator 340, guiding and converging the third light beam 162 propagated from the light beam deviating device 200 to the third light modulator 360, and guiding the first image light beams 322, the second image light beams 342, and the third image light beams 362 to the lens 400.

Therefore, in the first time period, after the first light beam 122 emitted from the first light source 120 passes through the beam combining module 800, the first light beam 122 is deviated to a different direction by the light beam deviating device 200 and is incident to the optical module 500. The optical module 500 guides and converges the first light beam 122 to the first light modulator 320, and the first light modulator 320 modulates the first light beam 122 into the first image light beam 322. The first image light beam 322 then passes through the optical module 500 and is guided to the lens 400 by the optical module 500.

In the same time period, after the second light beam 142 emitted from the second light source 140 passes through the beam combining module 800, the second light beam 142 is deviated to the different direction by the light beam deviating device 200 and is incident to the optical module 500. The optical module 500 guides and converges the second light beam 142 to the second light modulator 340, and the second light modulator 340 modulates the second light beam 142 into the second image light beam 342. The second image light beam 342 then passes through the optical module 500 and is guided to the lens 400 by the optical module 500.

In the same time period, after the third light beam 162 emitted from the third light source 160 passes through the beam combining module 800, the third light beam 162 is deviated to the different direction by the light beam deviating device 200 and is incident to the optical module 500. The optical module 500 guides and converges the third light beam 162 to the third light modulator 360, and the third light modulator 360 modulates the third light beam 162 into the third image light beam 362. The third image light beam 362 then passes through the optical module 500 and is guided to the lens 400 by the optical module 500.

The light beam deviating device 200 deviates the first light beam 122, the second light beam 142, and the third light beam 162 to the same direction in the first time period. Substantially, the actuator 220 can change the reflective mirror 214 (see FIG. 2) disposed on the propagation path of the first light beam 122 to another in the second time period, such that the first light beam 122, the second light beam 142, and the third light beam 162 are all deviated to another angle by the light beam deviating device 200. Therefore, the autostereoscopic display device in this embodiment can project the different first image light beams 322, the different second image light beams 342, and the different third image light beams 362 to different views through the lens 400 in sequence, and the user can experience a stereoscopic color image if his or her eyes are in different views.

The following paragraphs provide detailed explanations with respect to how to obtain the first image light beams 322, the second image light beams 342, and the third image light beams 362 with different deviating angles. First, in the first time period, the first light source 120, the second light source 140, and the third light source 160 can be switched on simultaneously, such that the first light beam 122, the second light beam 142, and the third light beam 162 reflected by the rotational mirror wheel 210 can be incident to the optical module 500. The optical module 500 includes converging lenses 510, 520, and a prism group 550. The converging lenses 510 and 520 are configured for converging the first light beam 122 reflected by the light beam deviating device 200 to the first light modulator 320, converging the second light beam 142 reflected by the light beam deviating device 200 to the second light modulator 340, and converging the third light beam 162 reflected by the light beam deviating device 200 to the third light modulator 360. The prism group 550 is configured for respectively guiding the first light beam 122, the second light beam 142, and the third light beam 162 passing through the converging lenses 510 and 520 to the first light modulator 320, the second light modulator 340, and the third light modulator 360, and guiding the first image light beams 322, the second image light beams 342, and the third image light beams 362 to the lens 400. Moreover, the reflective mirror 540 is configured for reflecting the first light beam 122, the second light beam 142, and the third light beam 162 passing through the converging lenses 510 and 520 to the prism group 550.

It should be understood that, the dashed arrows in FIG. 8 represent the propagation paths of the first light beam 122, the second light beam 142, and the third light beam 162 after being deviated, where the propagation paths in is different time periods are represented by different types of dashed arrows. For simplify matters, the propagation paths of the first light beam 122, the second light beam 142, and the third light beam 162 after being reflected by the reflective mirror 540 are represented by their optical axis (i.e. the solid arrows in FIG. 8). However, in real situation, all of the first light beam 122, the second light beam 142, and the third light beam 162 are deviated to different deviating directions in different time periods. Moreover, although there are three types of the dashed arrows in FIG. 8, the scope of the claimed invention should not be limited in this respect. In real situations, the number of the propagation paths of the first light beam 122, the second light beam 142, and the third light beam 162 after being deviated depends on the light beam deviating device 200.

Figure 9:
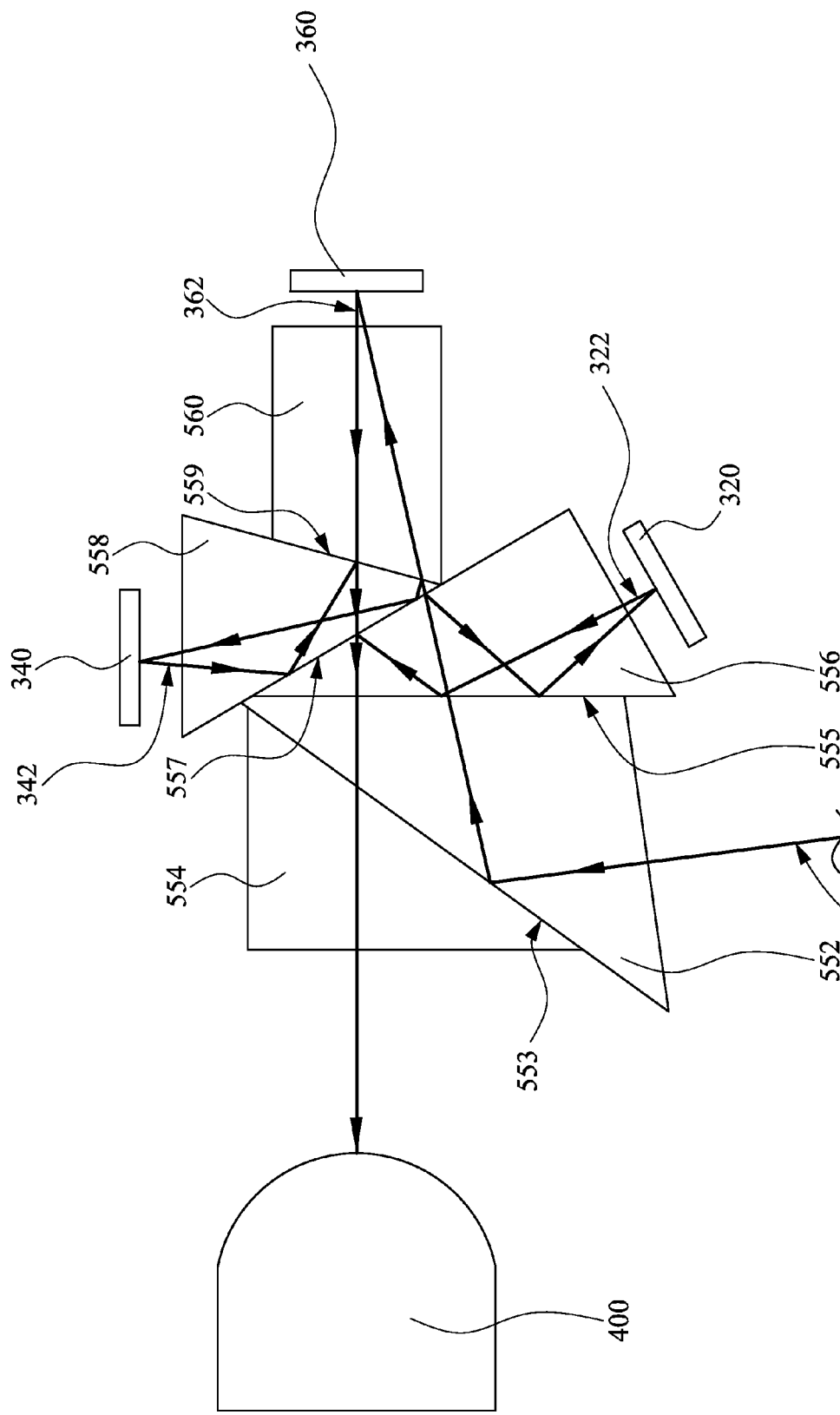
FIG. 9 is a schematic diagram of a prism group of FIG. 8.

FIG. 9 is a schematic diagram of the prism group 550 of FIG. 8. In this embodiment, the prism group 550 includes a first prism 552, a second prism 554, a third prism 556, a fourth prism 558, and a fifth prism 560. The first prism 552 and the second prism 554 define a first gap 553 therebetween, the first prism 552 and the third prism 556 define a second gap 555 therebetween, the third prism 556 and the fourth prism 558 define a third gap 557 therebetween, and the fourth prism 558 and the fifth prism 560 define a fourth gap 559 therebetween.

Reference is made back to FIG. 8. In the first time period, one of the reflective mirrors 214 (see FIG. 2) of the rotational mirror wheel 210 is disposed on the propagation path of the first light beam 122 by the actuator 220. The first light beam 122 is deviated to a deviating direction by the reflective mirror 214 (see FIG. 2), and then propagates to the converging lens 510. Subsequently, the first light beam 122 passes through the converging lenses 510 and 520 in sequence. After being deviated toward the optical axis 515 of the converging lenses 510 and 520, the first light beam 122 impinges on the reflective mirror 540, which reflects the first light beam 122 to the prism group 550. Reference is made to FIG. 9. The first light beam 122 is reflected by the first gap 553 when it is incident to the first prism 552. After passing through the second gap 555 and the third prism 556 in sequence, the first light beam 122 is reflected back to the third prism 556 by the third gap 557. As such, the first light beam 122 is guided to the first light modulator 320 by the third prism 556, and the first light modulator 320 modulates the first light beam 122 into the first image light beam 322. The first image light beam 322 then bounces back to the third prism 556, being reflected by the second gap 555 and the third gap 557 in sequence, passing through the third prism 556, the second gap 555, the first prism 552, the first gap 553, and the second prism 554 to the lens 400.

Reference is made back to FIG. 8. In the same time period, the second light beam 142 is deviated to the deviating direction by the reflective mirror 214, and then propagates to the converging lens 510. Subsequently, the second light beam 142 passes through the converging lenses 510 and 520 in sequence. After being deviated toward the optical axis 515 of the converging lenses 510 and 520, the second light beam 142 impinges on the reflective mirror 540, which reflects the second light beam 142 to the prism group 550. Reference is made to FIG. 9. The second light beam 142 is reflected by the first gap 553 when it is incident to the first prism 552. After passing through the second gap 555, the third prism 556, the third gap 557, and the fourth prism 558 in sequence, the second light beam 142 is reflected back to the fourth prism 558 by the fourth gap 559. As such, the second light beam 142 is guided to the second light modulator 340 by the fourth prism 558, and the second light modulator 340 modulates the second light beam 142 into the second image light beam 342. The second image light beam 342 then bounces back to the fourth prism 558, being reflected by the third gap 557 and the fourth gap 559 in sequence, passing through the fourth prism 558, the third gap 557, the third prism 556, the second gap 555, the first prism 552, the first gap 553, and the second prism 554 to the lens 400.

Reference is made back to FIG. 8. In the same time period, the third light beam 162 is deviated to the deviating direction by the reflective mirror 214, and then propagates to the converging lens 510. Subsequently, the third light beam 162 passes through the converging lenses 510 and 520 in sequence. After being deviated toward the optical axis 515 of the converging lenses 510 and 520, the third light beam 162 impinges on the reflective mirror 540, which reflects the third light beam 162 to the prism group 550. Reference is made to FIG. 9. The third light beam 162 is reflected by the first gap 553 when it is incident to the first prism 552. The third light beam 162 passes through the second gap 555, the third prism 556, the third gap 557, the fourth prism 558, the fourth gap 559, and the fifth prism 560 in sequence and reaches the third light modulator 360. The third light modulator 360 modulates the third light beam 162 into the third image light beam 362. The third image light beam 362 then bounces back to the fifth prism 560, passing through the fourth gap 559, the fourth prism 558, the third gap 557, the third prism 556, the second gap 555, the first prism 552, the first gap 553, and the second prism 554 to the lens 400.

Reference is made back to FIG. 8. In the second time period, another of the reflective mirrors 214 (see FIG. 2) of the rotational mirror wheel 210 is disposed on the propagation path of the first light beam 122 by the actuator 220. Consequently, the first image light beams 322, the second image light beams 342, and the third image light beams 362 corresponding to different views can be obtained as long as rotating the rotational mirror wheel 210 in sequence. Other features of the autostereoscopic display device are the same as those of the autostereoscopic display device shown in FIG. 7, and therefore, a description in this regard will not be provided hereinafter.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An autostereoscopic display device, comprising:
   a first light source for providing a first light beam;
   a light beam deviating device for deviating the first light beam propagated from the first light source to different directions in sequence, the light beam deviating device comprising:
      a rotational mirror wheel, comprising:
         a rotational wheel having a rotational axis; and
         a plurality of reflective mirrors disposed at the side of the rotational wheel, wherein at least one reflective area is formed on each of the reflective mirrors when the first light beam impinges on the reflective mirror, and the first light beam is reflected from the reflective area, and an angle is formed between the rotational axis and a normal line of the reflective area of each of the reflective mirrors, the angles of the reflective areas of the plurality of the reflective mirrors are different; and
      an actuator connected to the rotational mirror wheel for rotating the rotational mirror wheel;
   a first light modulator for modulating the first light beam into a plurality of first image light beams in sequence;
   a lens; and
   an optical module for guiding the first light beam propagated from the light beam deviating device to the first light modulator, and guiding the first image light beams to the lens,
   wherein the first image light beams are generated corresponding to different views while the light beam deviating device rotates for at least one circle.

2. The autostereoscopic display device of claim 1, wherein the angles of the reflective areas formed on the same reflective mirror in sequence are the same when the rotational mirror wheel rotates.

3. The autostereoscopic display device of claim 1, wherein the optical module comprises:
   at least one converging lens for converging the first light beam reflected from the light beam deviating device to the first light modulator; and a prism group for guiding the first light beam passing through the converging lens to the first light modulator, and guiding the first image light beams to the lens.

4. The autostereoscopic display device of claim 3, wherein the mirrors of the plurality of reflective mirrors are first reflective mirrors, and the optical module further comprises:
a second reflective mirror for reflecting the first light beam passing through the converging lens to the prism group.

5. The autostereoscopic display device of claim 1, further comprising:
a second light source for providing a second light beam;
a third light source for providing a third light beam; and
a light combining module for guiding the first light beam, the second light beam, and the third light beam to the light beam deviating device, respectively,
wherein the light beam deviating device is further for respectively deviating the second light beam and the third light beam to different directions in sequence, and deviating angles of the second light beam and the third light beam are substantially the same as a deviating angle of the first light beam in the same time period.

6. The autostereoscopic display device of claim 5, wherein the first light modulator is further for modulating the second light beam into a plurality of second image light beams in sequence, and modulating the third light beam into a plurality of third image light beams in sequence; and
wherein the optical module is further for guiding the second light beam and the third light beam propagated from the light beam deviating device to the first light modulator, and guiding the second image light beams and the third image light beams to the lens.

7. The autostereoscopic display device of claim 5, further comprising:
a second light modulator for modulating the second light beam into a plurality of second image light beams; and
a third light modulator for modulating the third light beam into a plurality of third image light beams,
wherein the optical module is further for guiding the second light beam propagated from the light beam deviating device to the second light modulator, guiding the third light beam propagated from the light beam deviating device to the third light modulator, and guiding the second image light beams and the third image light beams to the lens.

8. The autostereoscopic display device of claim 1, further comprising:
a beam forming element disposed between the first light source and the light beam deviating device; and
a second reflective mirror for reflecting the first light beam propagated from the first light source to the light beam deviating device.

9. The autostereoscopic display device of claim 1, wherein the light beam deviating device is an acousto-optic modulator, an electro-optical modulator, or a galvanometer mirror.

10. A projecting method of a projecting device, comprising:
rotating a rotational mirror wheel, wherein the rotational mirror wheel comprises a plurality of reflective mirrors;
guiding a first light beam to two adjacent reflective mirrors of the reflective mirrors of the rotational mirror wheel to deviate the first light beam to different directions by splitting the first light beam into two portions, a first portion of the first light beam deviated to a first direction, and a second portion of the first light beam deviated to a second direction, in sequence;
modulating the first light beam into a plurality of first image light beams in sequence, wherein the first image light beams are generated corresponding to different views while the rotational mirror wheel rotates for at least one circle, and the modulating comprises:
guiding the first portion and the second portion of the first light beam to a light modulator simultaneously to form two projection segments on a modulating surface of the light modulator, wherein positions of the two projection segments on the modulating surface are complementary; and
modulating the first light beam projected to the two projection segments into different first image light beams simultaneously; and
guiding the first image light beams to a lens.

11. The projecting method of claim 10, wherein an area of one of the two projection segments increases to cover the modulating surface of the light modulator as rotating the rotational mirror wheel.

* * * * *